US012642168B2

(12) United States Patent
Decker et al.

(10) Patent No.: US 12,642,168 B2
(45) Date of Patent: Jun. 2, 2026

(54) MOWER WITH FRONT MOUNTED ROTARY CUTTING DECK HAVING A TIPPED UP SERVICE POSITION

(71) Applicant: The Toro Company, Bloomington, MN (US)

(72) Inventors: Matthew J. Decker, Lakeville, MN (US); Luke R. Nahorniak, Lakeville, MN (US); Phat T. Nghiem, Minnetonka, MN (US)

(73) Assignee: The Toro Company, Bloomington, MN (US)

( * ) Notice: Subject to any disclaimer, the term of this patent is extended or adjusted under 35 U.S.C. 154(b) by 384 days.

(21) Appl. No.: 18/302,993

(22) Filed: Apr. 19, 2023

(65) Prior Publication Data

US 2023/0329146 A1     Oct. 19, 2023

Related U.S. Application Data

(63) Continuation of application No. 16/596,299, filed on Oct. 8, 2019, now Pat. No. 11,653,595.

(51) Int. Cl.
| *A01D 34/66* | (2006.01) |
| *A01D 34/64* | (2006.01) |
| *A01D 101/00* | (2006.01) |

(52) U.S. Cl.
CPC ........... *A01D 34/662* (2013.01); *A01D 34/64* (2013.01); *A01D 2034/645* (2013.01); *A01D 2101/00* (2013.01)

(58) Field of Classification Search
CPC ...... A01D 34/74; A01D 34/64; A01D 34/828; A01D 2101/00; A01D 34/662; A01D 34/04; A01D 34/24; A01D 34/28; A01D 34/86
See application file for complete search history.

(56) References Cited

U.S. PATENT DOCUMENTS

| 4,120,136 A | * | 10/1978 | Rose | ...................... A01D 34/64 |
| | | | | 56/15.8 |
| 4,134,249 A | * | 1/1979 | Wuerker | .............. A01D 34/005 |
| | | | | 56/320.1 |
| 4,563,019 A | * | 1/1986 | Kuhn | .................... A01B 59/048 |
| | | | | 280/481 |
| 4,779,406 A | | 10/1988 | Schroeder | |

(Continued)

FOREIGN PATENT DOCUMENTS

| JP | 08256556 | 10/1996 |
| JP | H08256556 | 10/1996 |

*Primary Examiner* — Brad Harcourt
(74) *Attorney, Agent, or Firm* — Merchant & Gould P.C.

(57) ABSTRACT

A mower comprises a frame carrying a front mounted rotary cutting deck. A deck lift moves the cutting deck between mowing and transport positions. The cutting deck can be selectively pivoted on the deck lift into a substantially tipped up service position to expose the underside of the cutting deck for service. The cutting deck has a self-engaging latch to hold it in its service position. A self-engaging catch provides a temporary hold position for the cutting deck that is short of the transport position as the cutting deck is being returned from the service position to prevent inadvertent contact between the cutting deck and the user. For ease of use, both the latch and the catch are releasable by a user from one side of the cutting deck which side also includes a rear foot pad and a front hand grip on the cutting deck.

20 Claims, 8 Drawing Sheets

(56)                    References Cited

U.S. PATENT DOCUMENTS

| | | | |
|---|---|---|---|
| 5,079,907 A | 1/1992 | Sameshima et al. | |
| 5,459,984 A | 10/1995 | Reichen et al. | |
| 5,816,035 A | 10/1998 | Schick | |
| 5,927,055 A | 7/1999 | Ferree et al. | |
| 6,079,907 A | 6/2000 | Valero Ruiz et al. | |
| 6,341,480 B1 | 1/2002 | Dahl et al. | |
| 6,347,503 B1 | 2/2002 | Esau et al. | |
| 6,459,984 B1 | 10/2002 | Aono et al. | |
| 6,516,597 B1 | 2/2003 | Samejima et al. | |
| 6,816,035 B2 | 11/2004 | Ma et al. | |
| 6,927,055 B2 | 8/2005 | Poulose et al. | |
| 7,451,586 B1 | 11/2008 | Papke et al. | |
| 7,481,036 B2 | 1/2009 | Lilliestielke et al. | |
| 9,220,188 B2 | 12/2015 | Graham et al. | |
| 9,288,940 B2 * | 3/2016 | Berglund | A01D 34/82 |
| 2002/0011059 A1 * | 1/2002 | Moore | A01D 34/74 |
| | | | 56/16.3 |
| 2002/0194826 A1 | 12/2002 | Schick et al. | |
| 2004/0221561 A1 | 11/2004 | Koehn | |
| 2007/0051083 A1 * | 3/2007 | Lilliestielke | A01D 34/662 |
| | | | 56/15.2 |
| 2008/0163598 A1 | 7/2008 | Koehn | |
| 2014/0083069 A1 | 3/2014 | Berglund | |
| 2019/0387676 A1 | 12/2019 | Welz et al. | |
| 2020/0068801 A1 | 3/2020 | Bengtzohn et al. | |

* cited by examiner

MOWER WITH FRONT MOUNTED ROTARY CUTTING DECK HAVING A TIPPED UP SERVICE POSITION

CROSS-REFERENCE TO RELATED APPLICATION

This application is a continuation of U.S. application Ser. No. 16/596,299, filed Oct. 8, 2019, now U.S. Pat. No. 11,653,595, the disclosure of which is hereby incorporated by reference in its entirety.

TECHNICAL FIELD

This invention relates to grass mowing equipment and, more particularly, to a mower equipped with a front mounted rotary cutting deck for cutting grass.

BACKGROUND OF THE INVENTION

Mowers having rotary cutting decks are well known for cutting grass. A rotary cutting deck generally comprises a low profile housing having a top wall and a skirt extending downwardly from the top wall along at least a portion of the periphery of the top wall. One or more cutting blades are housed within the cutting deck for cutting grass. Each cutting blade is rotatably supported by the top wall of the cutting deck and rotates about a generally vertical axis when cutting grass.

The mower employing a rotary cutting deck of the type described above typically includes a self-propelled frame to which the cutting deck is mounted. The mower frame usually has a pair of drive wheels which provide forward and reverse motion of the mower and a pair of steerable wheels that can be turned to steer the mower. The mower frame typically has a control station having a seat on which an operator sits, a steering wheel which the operator turns to steer the mower, and a traction pedal for operating the drive wheels to propel the mower. Other controls permit the operator to start and stop the operation of the cutting blades in the cutting deck and to lift and lower the cutting deck relative to the mower frame between a mowing position and a transport position using a deck lift.

In many mowers, the rotary cutting deck is front mounted to the mower frame in which substantially all of the cutting deck is forward of the drive and steerable wheels. The deck lift of the mower also extends at least partially forwardly of the wheels to overlie at least a rear portion of the cutting deck. The cutting deck is mounted to the overlying portion of the deck lift such that the propulsion of the mower frame is transmitted to the cutting deck through the deck lift. Mowers having this type of front mounted rotary cutting deck may also have, but need not necessarily have, other rotary cutting decks mounted thereon, such as side mounted rotary cutting decks arranged in a gang configuration relative to the front mounted rotary cutting deck.

The deck lift is used by the operator to move the cutting deck between a lowered mowing position for cutting grass and a raised transport position for use when driving the mower from one location to another without cutting grass. In the transport position, the front of the cutting deck has been tipped down relative to the rear of the cutting deck as the deck lift pivots upwardly on the mower frame as it moves between the mowing and transport positions. In the transport position of the cutting deck, the blades in the cutting deck are slightly or modestly exposed to a user. Such a user may be able to perform limited maintenance on the blades or the underside of the cutting deck in the transport position of the cutting deck if the user is able or willing to kneel or lie on the ground while doing so.

In order to increase the serviceability of a front mounted rotary cutting deck, it has been known in the art to move the cutting deck into a tipped up service position that is more steeply inclined relative to a user who is located in front of the cutting deck than the inclination provided in the transport position. In some cases, the tipped up service position is one in which the cutting deck is substantially vertical with the entire underside of the cutting deck and all of the cutting blades being readily accessible by the user. This has been generally accomplished by pivotally mounting the cutting deck to the deck lift, by removing various fasteners that normally lock out the pivotal motion of the cutting deck on the deck lift during motion of the cutting deck between its mowing and transports positions, by then manually pivoting the cutting deck from its transport to its more upright service position, and finally by installing other fasteners to hold the cutting deck in its service position. U.S. Pat. No. 5,079,907 to Sameshima et al., Japanese Published Patent Application JPH 08256556 to Shimamura et al., and U.S. Pat. No. 7,481,036 to Lilliestielke et al. all show front mounted rotary cutting decks of this type.

While effective for placing a front mounted rotary cutting deck in a more upright service position, the known prior art systems described above have various disadvantages. First, in unlatching the cutting deck from the deck lift, fasteners on both sides of the cutting deck have to be released, requiring the user to walk from one side of the cutting deck to the other side of the cutting deck in order to do so. When the cutting deck reaches its service position and it is time to relatch the cutting deck in the service position, the user often has to manually install a fastener in a locking aperture while simultaneously holding the deck against rotation and trying to align the fastener with the aperture. In some cases, this fastener and aperture alignment may have to be done on both sides of the cutting deck to properly relatch the cutting deck in the service position. Thus, the known prior art systems involve numerous steps and the need for precise alignment of various parts, both of which are disadvantageous.

SUMMARY OF THE INVENTION

One aspect of this invention relates to a mower for cutting grass. The mower comprises a self-propelled frame having a front mounted rotary cutting deck and a deck lift for lifting and lowering the cutting deck between a lowered mowing position and a raised transport position. The cutting deck is pivotally attached to the deck lift for motion of the cutting deck relative to the deck lift about a substantially lateral, horizontal pivot axis. The cutting deck is also selectively pivotable about the pivot axis to move the cutting deck from the transport position into a tipped up service position. A self-engaging latch acts between the cutting deck and the frame. The latch automatically latches the cutting deck and the frame to one another when the cutting deck reaches the tipped up service position.

Another aspect of this invention relates to a mower for cutting grass. The mower comprises a self-propelled frame having a front mounted rotary cutting deck and a deck lift for lifting and lowering the cutting deck between a lowered mowing position and a raised transport position. The cutting deck is pivotally attached to the deck lift for motion of the cutting deck relative to the deck lift about a substantially lateral, horizontal pivot axis. The cutting deck is also selectively pivotable about the pivot axis to move the cutting deck from the transport position into a tipped up service position. A center of gravity of the cutting deck is located forward of the pivot axis in the service position of the cutting deck such that gravity will pivot the cutting deck in a return motion back from the service position to the transport position. A catch acts between the cutting deck and the deck lift which catch automatically engages to stop the return motion of the cutting deck short of the transport position to provide a temporary hold position for the cutting deck to thereby mitigate risk of inadvertent contact between the user and the cutting deck as the cutting deck moves back towards the transport position.

Yet another aspect of this invention relates to a mower for cutting grass. The mower comprises a self-propelled frame having a front mounted rotary cutting deck. The cutting deck is pivotal relative to the frame for motion of the cutting deck about a substantially lateral, horizontal pivot axis. The cutting deck is selectively pivotable by a user about the pivot axis to move the cutting deck from a lower position into a tipped up service position. One side of the cutting deck has a rear foot pad and a front hand grip to allow a user who is standing behind the one side of the cutting deck to lift the cutting deck into the service position by pushing down on the foot pad with a foot of the user and by gripping and pulling upwardly and rearwardly on the hand grip with a hand of the user.

BRIEF DESCRIPTION OF THE DRAWINGS

This invention will be described more fully in the following Detailed Description, when taken in conjunction with the following drawings, in which like reference numerals refer to like elements throughout.

DETAILED DESCRIPTION

One embodiment of a mower of this invention for cutting grass on a turf surface is generally indicated as 2 in FIGS.

1 and 2. Mower 2 has a frame 4 supported for movement over the turf surface by a plurality of wheels 6, 8. Four wheels comprising a pair of front wheels 6 and a pair of rear wheels 8 are rotatably carried on frame 4 in a four wheel configuration. Alternatively, three wheels may be rotatably carried on frame 4 in a tricycle configuration.

Figure 2:
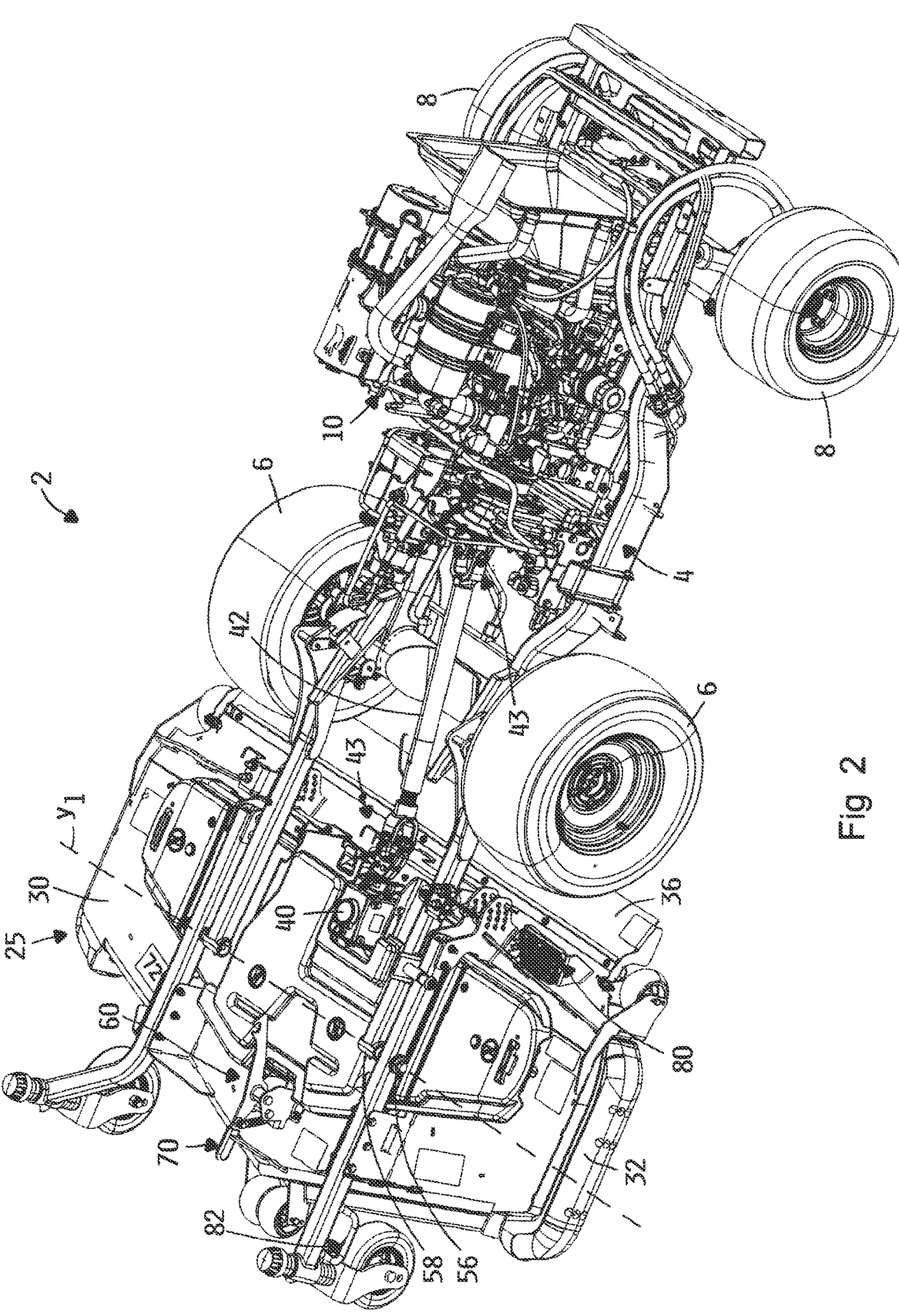
FIG. 2 is a rear perspective view of the mower of FIG. 1 with portions thereof having been removed to more particularly illustrate the prime mover carried on frame 4 and the drive shaft extending between the prime mover and the cutting deck.

As best shown in FIG. 2, a rearward portion of frame 4 carries a prime mover, e.g. an internal combustion engine 10, for providing power to operate mower 2. A hydraulic system (not shown) has a hydraulic pump (not shown) which is powered by engine 10. The pump supplies pressurized hydraulic fluid to a traction drive system comprising hydraulic drive motors (not shown) connected to front wheels 6 in a two wheel drive configuration or to all four wheels 6, 8 in a four wheel drive configuration. The pump further supplies pressurized hydraulic fluid to other sub-systems of mower 2, such as a power steering system (not shown) connected to the rear wheels 8 and to a deck lift 12, which will be described hereafter. Other prime movers, such as a hybrid engine/electric power supply or an entirely electric power supply, could be carried on frame 4 in place of engine 10.

Returning to FIG. 1, a control station 14 is carried on the front of frame 4 ahead of engine 10 whose location in FIG. 1 is denoted by the hood 16 that covers engine 10. A step 18 is provided on frame 4 for allowing the operator to mount and dismount from control station 14. Control station 14 includes a seat 20 for carrying the operator in a seated position. A steering wheel 22 ahead of seat 20 allows the operator to steer mower 2 through operation of the power steering system. A control console 24 adjacent seat 20 carries other operational controls (not shown) for operating a rotary cutting deck 25 and deck lift 12.

Control station 14 also includes a foot operated traction pedal. The traction pedal has a front pad 26 which is visible in FIG. 1 and a rear pad (not shown) which is rearward of and somewhat lower than front pad 26. The traction pedal propels frame 4 in a forward direction when the operator depresses front pad 26 with his or her toes and in a reverse direction when the operator depresses the rear pad with his or her heel. The degree or amount of pedal depression controls the ground speed of mower 2 in the selected direction depending upon how far from a neutral position the traction pedal has been depressed by the operator.

Figure 3:
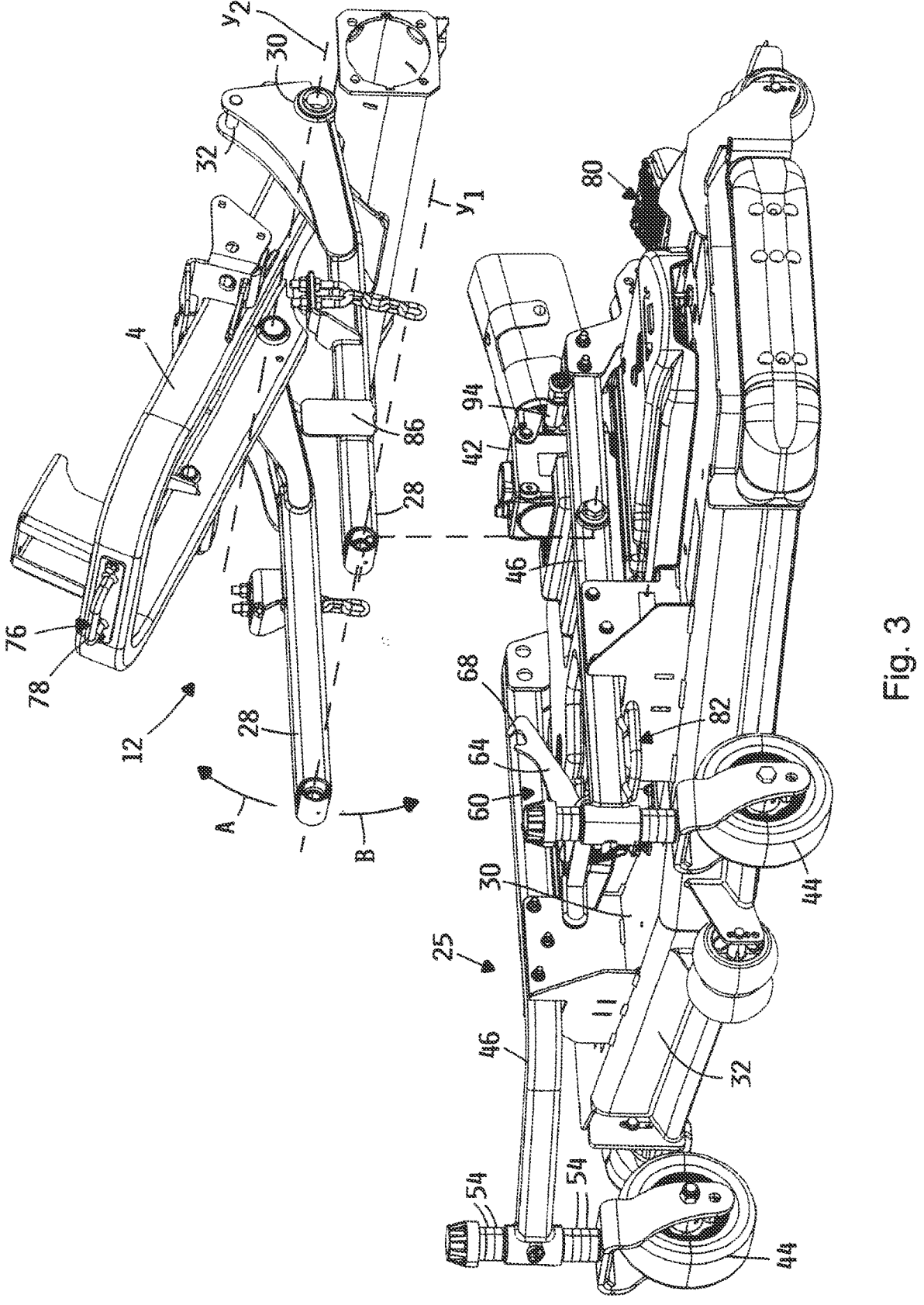
FIG. 3 is a perspective exploded view of a portion of the mower of FIG. 1, particularly illustrating the cutting deck and a portion of the deck lift and frame of the mower of FIG. 1.

Referring now to FIG. 3, deck lift 12 of mower 2 includes a pair of laterally spaced left and right lift arms 28. Pivot connections 30 on the rear ends of lift arms 28 are pivotally coupled to frame 4 for pivoting motion about a substantially horizontal pivot axis labelled $y_2$ in FIG. 3. Hydraulic actuators (not shown) are pivotally connected between frame 4 and upper pivot pins 32 on the rear ends of lift arms 28. When the actuators are powered by hydraulic fluid supplied thereto from the hydraulic power system of mower 2, lift arms 28 are pivoted in concert with one another in the direction of the arrow A to move cutting deck 25 from a lowered mowing position where cutting deck 25 is in contact with the turf surface to a slightly elevated transport position where cutting deck 25 is lifted up out of contact with the turf surface. To lower such an elevated cutting deck back to its mowing position, the hydraulic pressure supplied to the actuators is released and gravity returns cutting deck 25 back to its mowing position by inducing counter rotation of lift arms 28 in the direction of the arrow B in FIG. 3.

Figure 1:
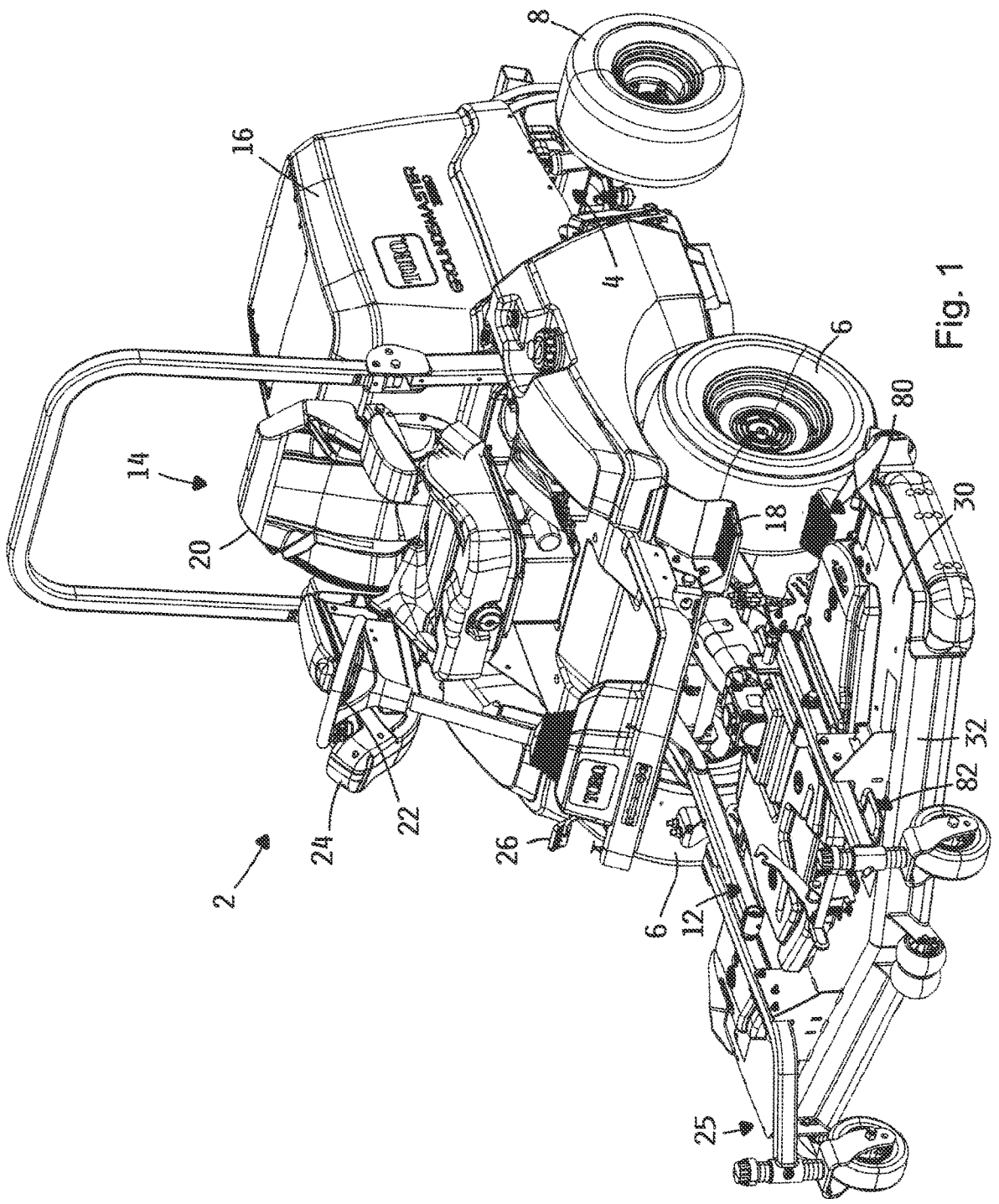
FIG. 1 is a front perspective view of one embodiment of a mower according to this invention having a front mounted rotary cutting deck.
Figure 8:
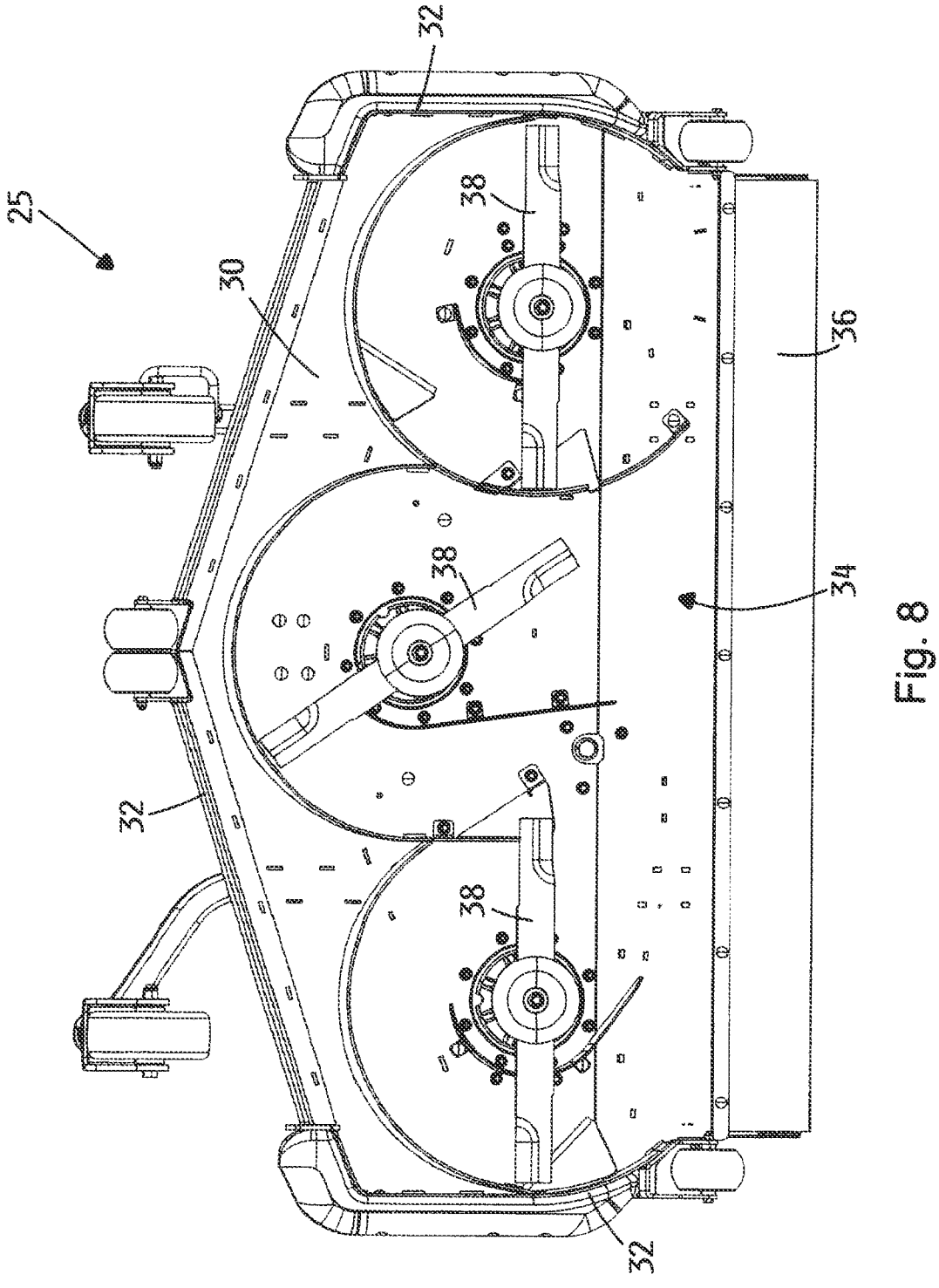
FIG. 8 is a front elevation view of the cutting deck in the tipped up service position.

As shown in FIGS. 1-3, cutting deck 25 is coupled to frame 4 to be propelled by frame 4 by lift arms 28 of deck lift 12. Cutting deck 25 has a low side profile and is formed by a top wall 30 and a short vertical skirt 32 extending downwardly around the periphery of top wall 30. In the particular embodiment of cutting deck 25 depicted herein and as best shown in FIG. 8, skirt 32 has a rear discharge opening 34 over most of the width of cutting deck 25 to permit grass clippings to be thrown rearwardly from rear discharge opening 34. A pivotal trailing flap 36 is connected to the upper edge of rear discharge opening 34 and slopes downwardly from top wall 30 of cutting deck 25 to deflect the grass clippings or other objects that might be thrown with the grass clippings downwardly towards the turf surface. Rather than having a rear discharge opening 34, cutting deck 25 may have a side discharge opening, or no discharge openings to serve as a mulching deck, or may be a single cutting deck that is convertible between mulching, rear discharge and/or side discharge modes of operation.

Cutting deck 25 has at least one cutting blade 38 which rotates in the cutting chamber formed beneath top wall 30 of cutting deck 25 and bounded by skirt 32 of cutting deck 25. In the particular embodiment of cutting deck 25 depicted herein and again as best shown in FIG. 8, cutting deck 25 has three such cutting blades 38 arranged in a staggered configuration in which the orbits of blades 38 do not overlap so as to cut a single unbroken swath of grass across the width of cutting deck 25. Cutting deck 25 may have different numbers of cutting blades, namely one blade only, two blades, three blades as shown in FIG. 6, and more blades if so desired. In addition, the orbits of blades 38 need not necessarily be staggered and may overlap one another if a timed drive system is used to rotate the blades to ensure the blades never hit one another.

Cutting blades 38 are driven by shafts that extend vertically upwardly and are rotatably journalled in top wall 30 of cutting deck 25 to rotate about a substantially vertical axis. The shafts of cutting blades 38 extend through top wall 30 to be driven by a belt drive system (not shown) located above top wall 30 of cutting deck 25 beneath various belt covers. A gearbox 40 located on top wall 30 of cutting deck 25 powers the belt drive system in a known manner. As best shown in FIG. 2, a drive shaft 42 extends between gearbox 40 and engine 10 to power gearbox 40 and thus power the belt drive system to rotate cutting blades 38. The shafts of cutting blades 38 could also be driven by hydraulic or electric motors instead of using gearbox 40 and driveshaft 42. When cutting blades 38 are rotated, blades 38 rotate in a substantially horizontal cutting plane relative to top wall 30 such that sharpened cutting edges on opposite sides of blades 38 sever the grass by impact between the cutting edges and uncut blades of grass.

Figure 7:
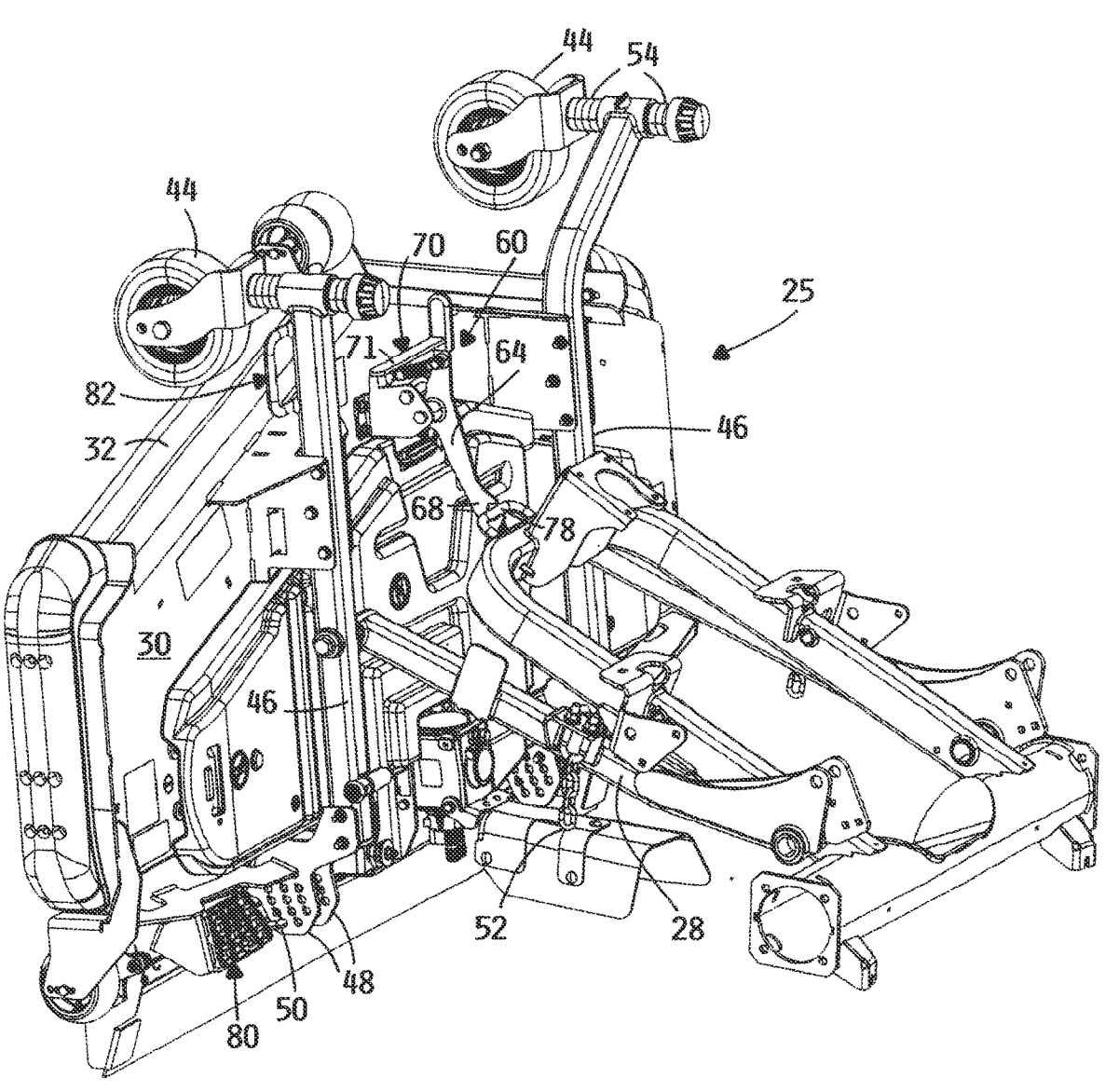
FIG. 7 is a rear perspective view of the cutting deck in the tipped up service position thereof.

Cutting deck 25 is supported in part for movement over the ground by a pair of laterally spaced, left and right front caster wheels 44 located at the forward ends of a pair of laterally spaced, left and right rails 46 which are bolted to mounting brackets on top wall 30 of cutting deck 25. See FIG. 3. As best shown in FIG. 7, the rear ends of rails 46 each carry a pair of laterally spaced plates 48 having an array of holes located at different heights. A laterally extending height of cut (HOC) adjustment pin 50 is placed in one selected set of holes in plates 48 with HOC pin 50 passing through a bottom link in a chain 52 that extends downwardly from the adjacent lift arm 28 of deck lift 12 to pass between plates 48. The height of cut of cutting deck 25 is adjusted in a known manner by selecting which set of holes in each pair of plates 48 receives HOC pin 50 and by adjusting the height of caster wheels 44 on cutting deck 25 using a plurality of repositionable spacers 54.

Each of the left and right rails 46 of cutting deck 25 is pivotally connected to the front ends of each of lift arms 28 by a pivot pin 56 on each rail that is received in a pivot hub

58 on the corresponding lift arm. See FIG. 2. These pivot connections are aligned with one another to establish a laterally extending pivot axis y1 about which cutting deck 25 may pivot relative to lift arms 28. When so connected, each lift arm 28 is adjacent to and immediately inboard of the corresponding rail 46. Selective pivoting of cutting deck 25 about axis y1 is what allows cutting deck 25 to be placed into a service position that eases the task of servicing cutting deck 25. Before describing the method of placing cutting deck 25 into the service position, the structure added to cutting deck 25 and mower 2 to accomplish this task will now be described.

Figures 4, 5:
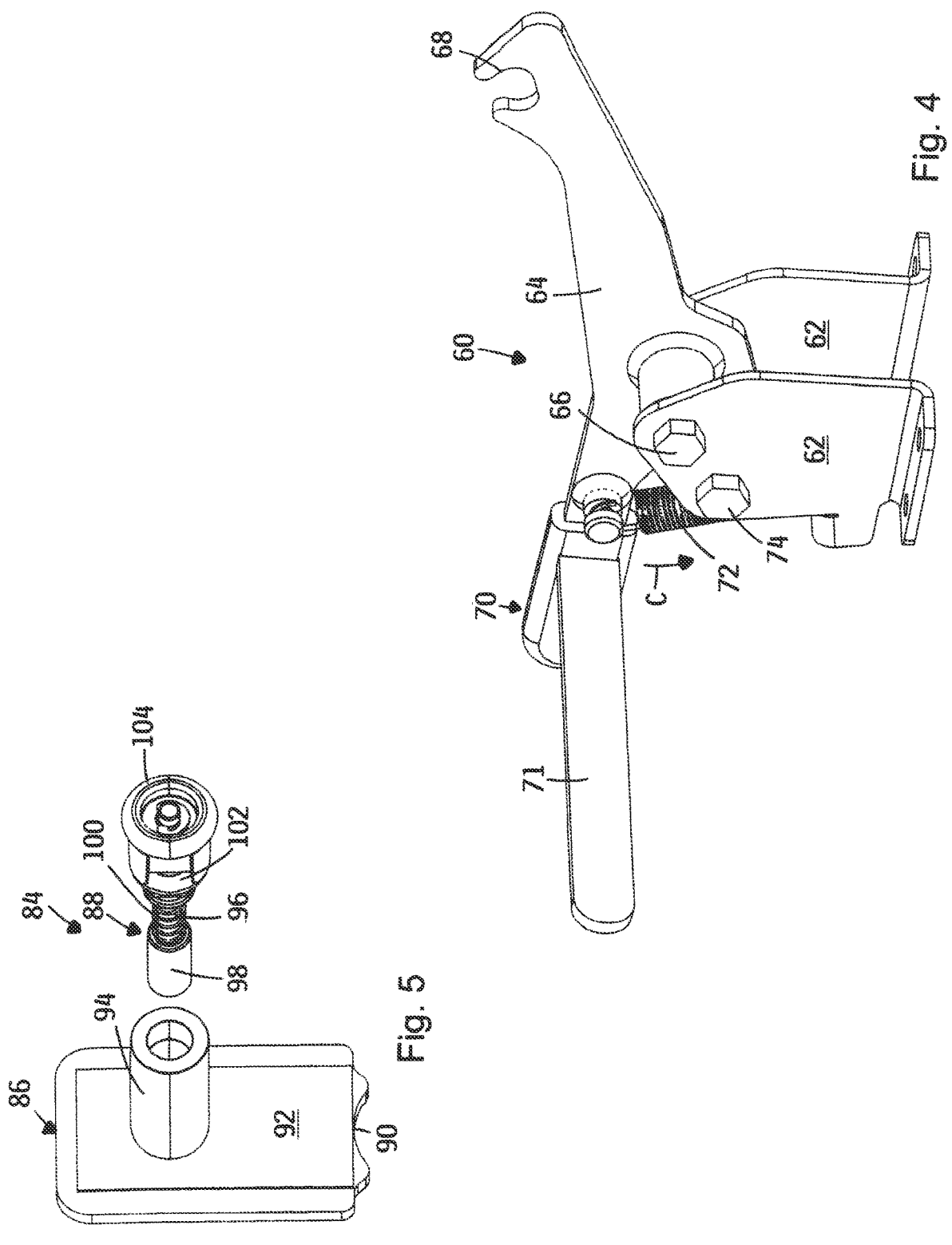
FIG. 4 is a perspective view of a portion of the mower of FIG. 1, particularly illustrating a portion of a self-engaging latch that is used to retain the cutting deck in a tipped up service position.
FIG. 5 is an exploded perspective view of a portion of the mower of FIG. 1, particularly illustrating a catch which engages when the cutting deck is being lowered out of its service position to a temporary hold position for the cutting deck.

Referring now to FIG. 4, a self-engaging latch 60 for retaining cutting deck 25 in its service position is shown. Latch 60 comprises a pair of laterally spaced vertical plates 62 having outwardly turned bottom flanges which are bolted to top wall 30 of cutting deck 25 to thereby mount latch 60 to top wall 30 of cutting deck 25. Latch 60 includes a latch member 64 having a middle portion pivotally mounted between plates 62 by a laterally extending pivot 66. Latch member 64 has a hook 68 at one end thereof and a release handle 70 at the other end thereof. A spring 72 applies a biasing force to latch member 64 which rotates latch member 64 in the direction of the arrow C in FIG. 4 until a portion of the bottom edge of latch member 64 hits a fixed stop pin 74 that extends between plates 60. Latch 60 is preferably positioned to be mounted on the front of cutting deck 25 to be substantially centered on a longitudinal centerline of mower 2 with latch member 64 extending along the longitudinal centerline. See FIG. 2.

Release handle 70 may include a laterally extending portion 71 as shown in the drawings. However, in another embodiment laterally extending portion 71 may be deleted from release handle 70. In this embodiment, release handle 70 simply comprises a forward portion of latch member 64 that may optionally include a surrounding grip member if so desired.

Referring now to FIG. 3, frame 4 of mower 2 mounts a U-shaped latch striker 76 having a transversely extending crossbar 78. Referring now to FIGS. 6C and 8, hook 68 of latch member 64 will automatically engage with and then latch onto crossbar 78 of latch striker 76 when cutting deck 25 nears and then reaches its service position. There is no need for the operator to do anything to make this happen other than for pivoting cutting deck 25 upwardly into its service position. Once latch member 64 is engaged with latch striker 76, the bias provided by spring 72 maintains hook 68 of latch member 64 on crossbar 78 of latch striker 76. However, when it is desired to lower cutting deck 25 out of its service position after a service operation is completed, the user may use release handle 70 on latch member 64 to selectively release latch member 64 from latch striker 76.

Referring now to FIGS. 2, 3 and 7, one side of cutting deck 25, e.g. preferably but not necessarily the left side, includes a rear foot pad 80 adjacent the rear edge of cutting deck 25. Foot pad 80 has a substantially planar upper surface. A longitudinal vertical plane containing the outer side of the left front wheel 6 approximately bisects rear foot pad 80 when viewed from above. Rear foot pad 80 is inclined upwardly relative to top wall 30 of cutting deck 25 as it extends rearwardly. The surface of rear foot pad 80 is roughened or knurled to enhance adhesion between rear foot pad 80 and a shoe or boot on one foot, e.g. the left foot, of the user.

A front U-shaped hand grip 82 is fixed to an outer side of left rail 46 of cutting deck 25 substantially closely behind front caster wheel 44 carried on left rail 46. In addition, release handle 70 on latch 60, with or without laterally extending portion 71, is positioned so that it can be gripped and manipulated by a user who is standing behind the left side of cutting deck 25. As will be set forth in more detail hereafter when describing the method of moving cutting deck 25 into and out of its service position, foot pad 80 together with hand grip 82 provide leverage to the user to easily and manually move cutting deck 25 into and out of its service position without the user having to move back and forth between opposite sides of mower 2 in order to do so.

Referring now to FIGS. 3 and 5, a catch 84 is provided which comes into play only in the final phase of lowering cutting deck 25 after releasing cutting deck 25 from its service position. Catch 84 comprises two parts: 1.) a latch plate 86 fixed to the left lift arm of deck lift 12, and 2.) a cooperable pin assembly 88 carried on left rail 46 of cutting deck 25 in a position where it is able to interact with latch plate 86.

Latch plate 86 comprises a small plate which is fixed to left lift arm 28 with an upper portion of the plate extending upwardly above left lift arm 28. Most of the rest of latch plate 86 lies against the side of left lift arm 28 with a lower edge of the plate forming a shallow, downwardly facing detent 90. Latch plate 86 may be a simple one piece plate as shown in FIG. 3 or a two part plate as shown in FIG. 5 in which latch plate 86 has a separate wear surface 92 adhered thereto.

Pin assembly 88 comprises a pin housing 94 which is welded to the top of left rail 46 of cutting deck 25. See FIG. 3. A slidable latch pin 96 is contained in pin housing 94 and has an enlarged head 98 that extends through an opening (not shown) in a first end of pin housing 94. A spring 100 surrounds latch pin 96 and bears at one end against head 98 of latch pin 96 and at the other end against a cap 102 that closes the second end of pin housing 94. The spring urges latch pin 96 in a direction in which head 98 of latch pin 96 is projected at least partially outwardly through the opening in the first end of pin housing 94 to engage latch plate 86. A knob 104 is affixed to the other end of latch pin 96 outwardly of cap 102 to retain the parts of pin assembly 88 in an assembled relationship and to allow the user to pull rearwardly on latch pin 96 to retract head 98 of latch pin 96 as needed during the operation of catch 84. The operation of catch 84 will be described in more detail hereafter.

Cutting deck 25 of this invention is movable by a user into the service position shown in FIGS. 6C and 7 more easily than other known rotary cutting decks. The method for doing so will now be described.

Figure 6B:
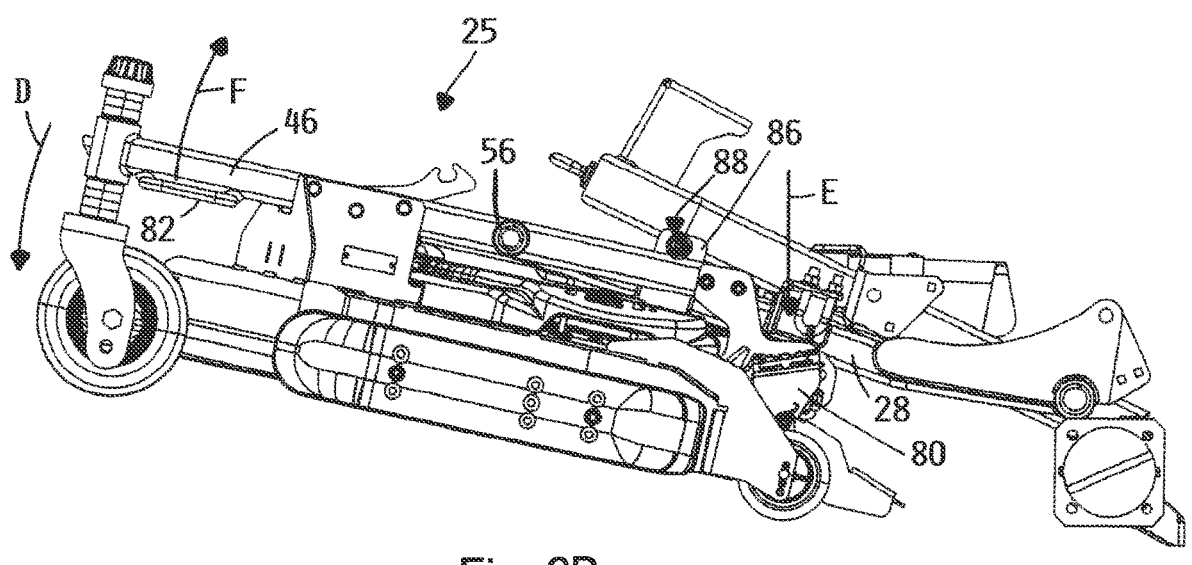
FIGS. 6A-6D are side elevational views of a portion of the mower of FIG. 1, particularly illustrating the orientation of the cutting deck in a mowing position, a transport position, the tipped up service position, and the temporary hold position, respectively.
Figure 6A:
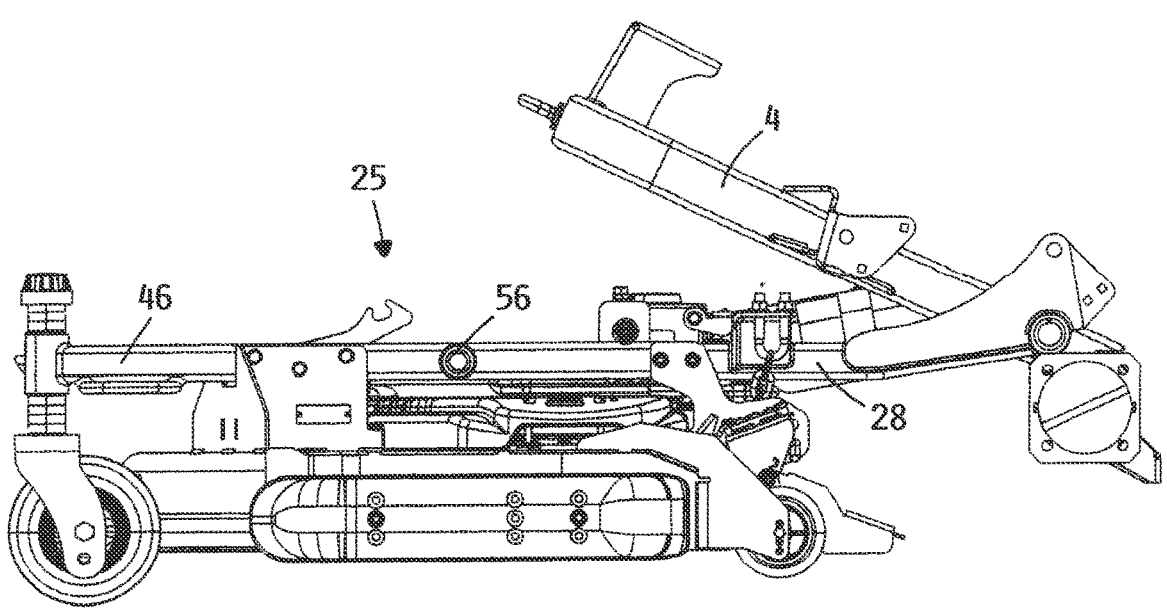

The steps of the method that are to be followed depend upon whether cutting deck 25 is originally disposed in the mowing position of FIG. 6A or the transport position of FIG. 6B. In the mowing position of FIG. 6A, deck lift 12 has been lowered and is in a float mode. Accordingly, the front caster wheels of cutting deck 25 rest on the turf surface or the ground with the weight of cutting deck 25 being primarily borne by the turf surface or ground during a mowing operation. Cutting deck 25 is generally horizontal when disposed in the mowing position as shown in FIG. 6A.

If the mowing deck is in the mowing position of FIG. 6A when a user wishes to move cutting deck 25 into the service position, the first step is to use deck lift 12 to lift cutting deck 25 upwardly out of contact with the turf surface or the ground to place cutting deck 25 into the transport position shown in FIG. 6B. This step may be skipped if the mowing deck is already in the transport position. Since the center of gravity of cutting deck 25 is forward of the pivot pins 56 that mount cutting deck 25 to lift arms 28 of deck lift 12, the nose of cutting deck 25 will pivot downwardly slightly in the direction of the arrow D in FIG. 6B as cutting deck 25 comes off the ground to lift the rear of cutting deck 25 up against a stop on deck lift 12. This unloads the weight of cutting deck 25 from HOC pins 50.

Accordingly, with cutting deck 25 in the transport position, whether cutting deck 25 was in the transport position originally or was purposely moved into the transport position by the user, the user must then remove HOC pins 50. This is done by pulling HOC pins 50 outwardly from whatever set of holes they had been received in to disconnect HOC pins 50 from plates 48 and chains 52 through which HOC pins 50 had passed. Since HOC pins 50, plates 48 and chains 52 are disposed on both the left and right sides of cutting deck 25, this requires the user to pull HOC pin 50 on one side of cutting deck 25 and then walk around to the other side of cutting deck 25 to pull the other HOC pin 50. However, this is the only time during the method of moving cutting deck 25 to its service position that the user must move between opposite sides of cutting deck 25. Once HOC pins 50 have been removed, the user can remain on just one side of cutting deck 25 to first move cutting deck 25 from the transport position to its service position and then subsequently to lower cutting deck 25 from the service position back to its transport position.

Referring now to FIG. 6B and with the user standing close to the front of but outboard of the left front wheel 6, the user can begin the movement of cutting deck 25 to its service position by putting his left foot on top of foot pad 80 at the left rear corner of cutting deck 25 and by pushing down on that foot pad in the direction of the arrow E in FIG. 6B. Simultaneously with or very shortly after the beginning of that action, the user can bend forward with his or her upper body and grab hand grip 82 at the front of left rail 46 of cutting deck 25 with his or her left hand to pull upwardly and rearwardly on the front of cutting deck 25 in the direction of the arrow F in FIG. 6B. The combined push/pull actions by the user lifts cutting deck 25 upwardly from the transport position of FIG. 6B towards the service position of FIG. 6C in an unbroken movement by the user.

Cutting deck 25 will preferably be positioned high enough in its transport position such that it pivots about pivot pins 56 to be free of contact with the ground with the exception of trailing flap 36 that covers rear discharge opening 34. However, flap 36 is pivotally mounted to the rear of cutting deck 25 and thus will simply pivot or bend under contact with the ground as cutting deck is raised into its service position. When cutting deck 25 is disposed in the service position, flap 36 may be disposed substantially flat against the ground.

As cutting deck 25 reaches the service position, latch member 64 of latch 60 hits latch striker 76 and hook 68 self-engages crossbar 78 of latch striker 76 to retain cutting deck 25 in the service position of FIG. 6C. The self-engaging action of latch 60 relieves the user of the need to hold cutting deck 25 in the service position while he or she attempts to align and engage a manually engageable latch, such as a pin received in a hole, and of walking to the other side of cutting deck 25 to insert a second manually engageable latch.

As shown in FIG. 6B, cutting deck 25 has a tipped up service position that is elevated more than 60° and is preferably elevated at least about 80° from horizontal. This provides the user with adequate access to cutting blades 38 and the underside of cutting deck 25 to perform most of the maintenance tasks that are customarily needed there. Drive shaft 42 has enough clearance in frame 4 and further has motion accommodating joints 43 as shown in FIG. 2 to gearbox 40 and to engine 10. These factors provide enough freedom of motion that drive shaft 42 can remain connected to cutting deck 25 throughout its elevation between the mowing position and the service position without damaging drive shaft 42 or its power transmitting joints 43. This avoids having to disconnect drive shaft 42 from gearbox 40 of cutting deck 25 in order to place cutting deck 25 into the service position. This is a further improvement over some prior art cutting decks in which the drive shaft must be disconnected from the cutting deck to permit the cutting deck 25 be placed into a tipped up service position.

Finally, as cutting deck 25 moves between its transport and service positions, latch pin 96 of locking pin assembly 88 of catch 84 is initially abutted against the face of latch plate 86 without in any way being locked to latch plate 86. Since latch plate 86 has no holes in which head 98 of latch pin 96 can engage into, head 98 of latch pin 96 merely slides downwardly on the face of latch plate 86 or on the wear surface 92 if one is applied to latch plate 86 until latch pin 96 passes past the lower edge of latch plate 86. At this point, the spring bias on latch pin 96 will extend latch pin 96 momentarily inwardly with head 98 of latch pin 96 engaging on detent 90 on the underside of the lower edge of latch pin 96.

If the user were to interrupt the movement of cutting deck 25 at this precise instant, latch pin 96 would remain engaged with detent 90. However, since the user is in the process of lifting cutting deck 25 up into the service position, the user's normally uninterrupted motion in doing so almost immediately disengages latch pin 96 from detent 90 with latch pin 96 simply moving downwardly out of detent 90 as cutting deck 25 moves on up to the service position. To the user who is lifting cutting deck 25 from its transport to its service position using his or her left foot and left hand in a coordinated manner to push down on the rear of cutting deck 25 while simultaneously pulling back on the front of cutting deck 25, catch 84 has no effect. For all practical purposes, the user doesn't even notice the momentary engagement of latch pin 96 in detent 90 during the motion of cutting deck 25 from the transport position to the service position.

As noted earlier herein, when cutting deck 25 is in its service position as shown in FIGS. 6C, 7 and 8, self-engaging latch 60 retains cutting deck 25 in the service position while service is being performed on cutting deck 25. When such service is over and the user wishes to lower cutting deck 25 to its transport position, the user can do so entirely from the same side of cutting deck 25 at which the user stood during the deck lifting step, e.g. the left side in mower 2 embodiment shown herein, without having to move back and forth between the left and right sides of cutting deck 25 to release separate latches. The first action in the cutting deck lowering step is to use hand grip 82 to pull cutting deck 25 into a slightly more elevated position to unload the weight of cutting deck 25 from latch 60. Then, the user simply uses his or her right hand to grab release handle 70 on latch 60 to pivot latch member 64 in a direction that unhooks hook 68 from latch striker 76. Once latch 60 is disengaged, the user then can begin to lower cutting deck 25 and after it begins to lower the user can let go of release handle 70.

The center of gravity of cutting deck 25 remains forward of the horizontal pivot axis of cutting deck 25 in the service position. Consequently, the user need not apply the same type of leg and arm force to cutting deck 25 to lower cutting deck 25 as was needed when the user lifted cutting deck 25 to the service position. During lowering of cutting deck 25, gravity will itself act through the lever arm between the center of gravity and the pivot pins 56 to pivot cutting deck 25 back downwardly. Thus, the user need only use his or her left foot atop foot pad 80 and apply some downward leg pressure to retard the downward motion of cutting deck 25 to control the rate of descent of cutting deck 25.

It is during deck lowering that catch 84 performs its intended function of automatically engaging latch pin 96 in detent 90 of latch plate 86 to establish a temporary hold position that is short of the transport position. Once engaged in the downwardly facing detent, latch pin 96 cannot be disengaged from detent 90 without the operator pulling latch pin 96 outwardly of detent 90 since the force being supplied by gravity to cutting deck 25 firmly engages latch pin 96 in detent 90. See FIG. 6D. Thus, if a user were to be positioned in a spot where his or her right leg is located between the left front wheel of frame 4 and the rear edge of cutting deck 25, catch 84 is provided to temporarily hold cutting deck 25 in a safe position to permit the user to get his or her right leg out of the way of cutting deck 25. Catch 84 also works to perform this function should the user fail to properly elevate cutting deck 25 all the way to its service position and releases cutting deck 25 before the deck lifting process is completed.

Figure 6D:
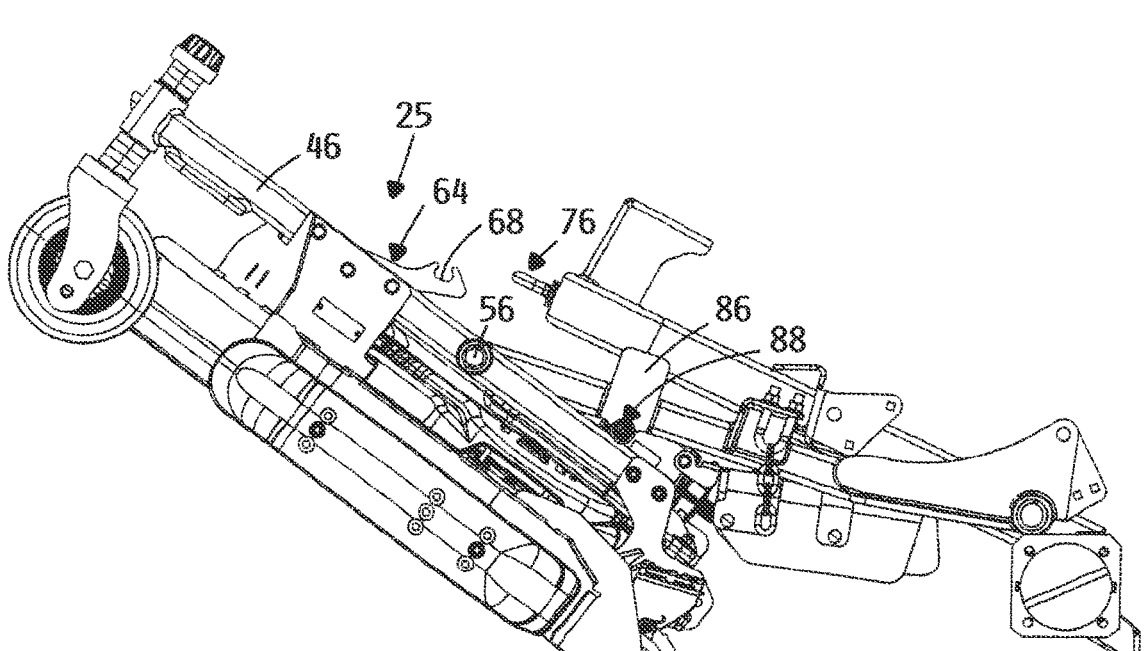
Figure 6C:
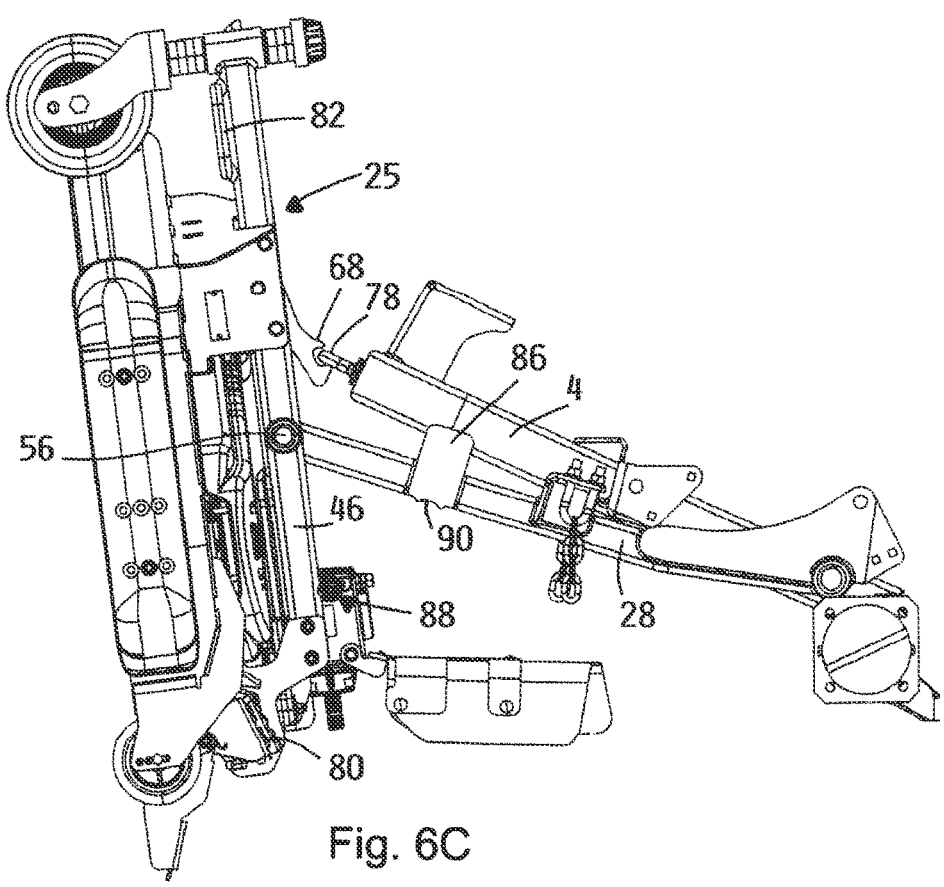

With cutting deck 25 in the temporary hold position of FIG. 6D and with the user safely positioned out of the way, the user can then apply a slight downward force using his or her foot against foot pad 80 and then pull latch pin 96 outwardly to remove head 98 of latch pin 96 from detent 90 on latch plate 86. Gravity acting on the center of gravity of cutting deck 25 will then finish pivoting cutting deck 25 back to its transport position in which the rear of cutting deck 25 is engaged with a stop on deck lift 12. If the user so desires, HOC pins 50 may then be reset by passing such pins through a selected set of holes in the pairs of plates 48 and their corresponding chains 52 to establish a desired HOC. If mower 2 is to be out of service at that time, cutting deck 25 can be left in the transport position. Ultimately, when mower 2 is put back into service and arrives at a spot where mowing is to commence, the operator of mower 2 can then use deck lift 12 to lower cutting deck 25 from its transport position to its mowing position.

Cutting deck 25 of this invention may be more quickly and easily moved into a substantially elevated service position and vice versa than other prior art front mounted rotary cutting decks. Fewer steps and actions are required of the user. With the exception of removing or reinstalling the HOC pins 50, the user can remain on one side of the mower while moving cutting deck 25 into its service position or while lowering cutting deck 25 from its service position. Moreover, catch 84 ensures that the user will not be inadvertently contacted by cutting deck 25 during deck lowering.

Various modifications of this invention will be apparent to those skilled in the art. For example, rather than relying upon a user to use leg and arm power to lift cutting deck 25 from its transport position to its tipped up service position, a powered actuator, such as a hydraulic cylinder, could be pivotally connected at one end to frame 4 and at the other end to cutting deck 25 to provide the force required to pivot cutting deck 25 to the service position.

Accordingly, the invention shall not be limited to the embodiment of mower 2 disclosed herein, but shall be limited only by the appended claims.

The invention claimed is:

1. A method of moving a cutting deck of a mower from a lowered mowing position, in which the cutting deck is in contact with a ground surface, into a service position, in which the cutting deck is raised away from the ground surface, the method comprising:

(a) lifting the cutting deck upwardly and out of contact with the ground surface from the lowered mowing position to a raised transport position;

(b) pushing a foot pad associated with the cutting deck downwardly while pulling a hand grip associated with the cutting deck upwardly and rearwardly to move the cutting deck to the service position; and (c) automatically latching the cutting deck to a frame of the mower to hold the cutting deck in the service position.

2. The method of claim 1, further comprising:

removing height of cut (HOC) pins from the cutting deck after lifting the cutting deck into the transport position.

3. The method of claim 1, wherein prior to lifting the cutting deck, front caster wheels disposed on the cutting deck sit on the ground surface in a horizontal position.

4. The method of claim 2, wherein lifting the cutting deck directs a nose of the cutting deck downwardly, unloading weight of the cutting deck from the HOC pins and onto a deck lift.

5. The method of claim 2, wherein the HOC pins are removed by pulling the HOC pins outwardly from plates or chains on the cutting deck.

6. The method of claim 5, wherein the HOC pins are located on left and right sides of the cutting deck.

7. The method of claim 1, wherein when the cutting deck is in the transport position, the cutting deck does not contact the ground surface except for a trailing flap covering a rear discharge opening of the mower.

8. The method of claim 7, wherein the trailing flap is substantially flat against the ground surface when the cutting deck is in the service position.

9. The method of claim 1, wherein when the cutting deck is in the service position, the cutting deck is rotated by at least 60 degrees relative to the ground surface.

10. The method of claim 9, wherein when the cutting deck is in the service position, the cutting deck is rotated by at least 80 degrees relative to the ground surface.

11. The method of claim 1, wherein moving the cutting deck from the lowered mowing position to the service position does not comprise disconnecting a drive shaft of the mower from a gearbox of the cutting deck.

12. A method of moving a cutting deck of a mower from a service position, in which the cutting deck is raised away from the ground surface, to a lowered mowing position, in which the cutting deck is in contact with a ground surface, the method comprising:

(a) pushing a foot pad associated with the cutting deck downwardly and pulling a hand grip associated with the cutting deck upwardly and rearwardly;

(b) engaging a release handle connected to a latch to disengage the latch from a frame of the mower; and (c) lowering the cutting deck to the ground surface, wherein the cutting deck is configurable between the lowered mowing position and a raised transport position.

13. The method of claim 12, wherein pulling the hand grip to elevate the cutting deck unloads weight from the latch onto the cutting deck.

14. The method of claim 12, wherein once the cutting deck begins to lower, the release handle is no longer engaged.

15. The method of claim 12, wherein lowering the cutting deck uses gravity to lower the cutting deck.

16. The method of claim 12, wherein the lowering step includes first lowering the cutting deck to a temporary hold position at which point the latch automatically engages to hold the cutting deck in the temporary hold position, and disengaging the latch, further lowering the cutting deck to a transport position on the ground surface.

17. The method of claim 16, wherein disengaging the latch includes pulling a latch pin outwardly to disengage the latch pin from a detent.

18. The method of claim 17, wherein in the transport position, a rear end of the cutting deck is engaged with a stop on a deck lift.

19. The method of claim 18, wherein height of cut (HOC) pins are engaged with plates on the cutting deck.

20. The method of claim 19, wherein after the HOC pins are engaged, the cutting deck is lowered to the ground surface in the mowing position.

\* \* \* \* \*